United States Patent
Vasudevan et al.

(10) Patent No.: US 9,244,677 B2
(45) Date of Patent: Jan. 26, 2016

(54) LOOP VECTORIZATION METHODS AND APPARATUS

(71) Applicant: Intel Corporation, Santa Clara, CA (US)

(72) Inventors: Nalini Vasudevan, Sunnyvale, CA (US); Jayashankar Bharadwaj, Saratoga, FL (US); Christopher J. Hughes, Santa Clara, CA (US); Milind B. Girkar, Sunnyvale, CA (US); Mark J Charney, Lexington, MA (US); Robert Valentine, Qiryat Tivon (IL); Victor W. Lee, San Jose, CA (US); Daehyun Kim, San Jose, CA (US); Albert Hartono, Santa Clara, CA (US); Sara S. Baghsorkhi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 13/630,147

(22) Filed: Sep. 28, 2012

(65) Prior Publication Data

US 2014/0096119 A1    Apr. 3, 2014

(51) Int. Cl.
*G06F 9/44* (2006.01)
*G06F 9/38* (2006.01)
*G06F 9/45* (2006.01)

(52) U.S. Cl.
CPC ........ *G06F 8/70* (2013.01); *G06F 8/452* (2013.01); *G06F 9/38* (2013.01); *G06F 8/433* (2013.01)

(58) Field of Classification Search
None
See application file for complete search history.

(56) References Cited

U.S. PATENT DOCUMENTS

| | | | |
|---|---|---|---|
| 4,833,606 A * | 5/1989 | Iwasawa et al. | 717/160 |
| 5,790,866 A | 8/1998 | Robison | |
| 5,802,375 A * | 9/1998 | Ngo et al. | 717/160 |
| 5,958,048 A | 9/1999 | Babaian | |
| 6,438,747 B1 * | 8/2002 | Schreiber et al. | 717/160 |
| 6,507,947 B1 | 1/2003 | Schreiber | |
| 6,772,415 B1 * | 8/2004 | Danckaert et al. | 717/161 |
| 7,395,419 B1 | 7/2008 | Gonion | |
| 7,478,377 B2 * | 1/2009 | Eichenberger et al. | 717/150 |
| 8,087,010 B2 | 12/2011 | Eichenberger et al. | |
| 8,136,107 B2 | 3/2012 | Zaks | |
| 8,141,068 B1 * | 3/2012 | Thompson | 717/161 |
| 8,176,299 B2 | 5/2012 | Gonion et al. | |
| 8,196,124 B2 | 6/2012 | Eichenberger et al. | |
| 8,245,208 B2 * | 8/2012 | Eichenberger et al. | 717/150 |
| 8,549,501 B2 * | 10/2013 | Eichenberger et al. | 717/150 |
| 8,640,112 B2 * | 1/2014 | Yi et al. | 717/149 |
| 2002/0091996 A1 | 7/2002 | Topham | |

(Continued)

OTHER PUBLICATIONS

Krall et al., "Compilation Techniques for Multimedia Processors," 2000, International Journal of Parallel Programming Aug. 2000, vol. 28, Issue 4, pp. 347-361.*

(Continued)

*Primary Examiner* — Thuy Dao
*Assistant Examiner* — Stephen Berman
(74) *Attorney, Agent, or Firm* — Hanley, Flight & Zimmerman, LLC

(57) ABSTRACT

Loop vectorization methods and apparatus are disclosed. An example method includes setting a dynamic adjustment value of a vectorization loop; executing the vectorization loop to vectorize a loop by grouping iterations of the loop into one or more vectors; identifying a dependency between iterations of the loop as; and setting the dynamic adjustment value based on the identified dependency.

15 Claims, 9 Drawing Sheets

(56) References Cited

U.S. PATENT DOCUMENTS

| | | | |
|---|---|---|---|
| 2002/0120923 | A1 | 8/2002 | Granston |
| 2002/0133813 | A1 | 9/2002 | Ostanevich |
| 2004/0068718 | A1 | 4/2004 | Cronquist |
| 2004/0098713 | A1 | 5/2004 | Ogawa |
| 2005/0039167 | A1 | 2/2005 | Fernandes |
| 2005/0131977 | A1* | 6/2005 | Bera .......................... 708/446 |
| 2006/0004996 | A1 | 1/2006 | Gonion |
| 2007/0074195 | A1 | 3/2007 | Liao |
| 2007/0157184 | A1* | 7/2007 | Liu et al. ....................... 717/144 |
| 2007/0169061 | A1* | 7/2007 | Bera et al. ..................... 717/160 |
| 2007/0226723 | A1 | 9/2007 | Eichenberger et al. |
| 2009/0064120 | A1* | 3/2009 | Liu et al. ....................... 717/160 |
| 2009/0113404 | A1* | 4/2009 | Takayama et al. ............ 717/149 |
| 2010/0077182 | A1 | 3/2010 | Gonion et al. |
| 2011/0029962 | A1* | 2/2011 | Nuzman et al. ............... 717/160 |
| 2011/0035568 | A1 | 2/2011 | Gonion et al. |
| 2011/0161944 | A1 | 6/2011 | Cho et al. |
| 2011/0238948 | A1 | 9/2011 | Vorbach et al. |
| 2011/0283092 | A1 | 11/2011 | Gonion |
| 2012/0167069 | A1 | 6/2012 | Lin et al. |
| 2012/0192167 | A1* | 7/2012 | Eichenberger et al. ....... 717/150 |
| 2012/0254845 | A1* | 10/2012 | Yi et al. ......................... 717/144 |
| 2013/0125097 | A1 | 5/2013 | Ebcioglu |
| 2013/0290943 | A1* | 10/2013 | Uliel et al. ..................... 717/160 |
| 2014/0007061 | A1* | 1/2014 | Perkins et al. ................ 717/150 |
| 2014/0053129 | A1 | 2/2014 | Von Platen et al. |
| 2014/0122832 | A1 | 5/2014 | Ngai |
| 2015/0007154 | A1 | 1/2015 | Bharadwaj et al. |

OTHER PUBLICATIONS

Bik et al., "Efficient Exploitation of Parallelism on Pentium III and Pentium 4 Processor-Based Systems," 2001, pp. 1-9, downloaded from <url>: http://citeseerx.ist.psu.edu/viewdoc/download;jsessionid=36C3598234770A56E88B64FAD8D017-0B?doi=10.1.1.14.7955&rep=rep1&type=pdf on Aug. 8, 2015.*

Nuzman et al., "Outer-loop vectorization: revisited for short SIMD architectures," 2008, Proceedings of the 17th international conference on Parallel architectures and compilation techniques, pp. 2-11.*

Udupa et al., "ALTER: Exploiting Breakable Dependences for Parallelization", PLDI'11, Jun. 4-8, 2011, 12 pages, California, USA.

Patent Cooperation Treaty, "International Search Report," issued in connection with International Patent Application No. PCT/US2013/032111, on Nov. 26, 2013 (3 pages).

Patent Cooperation Treaty, "Written Opinion of the International Searching Authority" issued in connection with International Patent Application No. PCT/US2013/032111, on Nov. 26, 2013 (5 pages).

United States Patent and Trademark Office, "Non-Final Office Action," issued in connection with U.S. Appl. No. 13/994,062, Apr. 9, 2015, 34 pages.

Horwitz et al., "Dependence Analysis for Pointer Variables," ACM SIGPlan Notices, vol. 24, No. 7, ACM 1999.

Larsen et al., "Exploiting Vector Parallelism in Software Pipelined Loops," Proceedings of the 38th Annual IEEE/ACM International Symposium on Microarchitecture, IEEE Computer Society, 2005.

Petersen et al., "Automatic SIMD Vectorization for Haskell," ACM SIGPLAN Notices, vol. 48, No. 9, ACM, 2013.

International Bureau, "International Preliminary Report on Patentability," issued in connection with International Patent Application No. PCT/US2013/032111, mailed Sep. 15, 2015 (6 pages).

United States Patent and Trademark Office, "Notice of Allowance," issued in connection with U.S. Appl. No. 13/994,062, mailed Oct. 13, 2015 (90 pages).

* cited by examiner

100

```
for(i=1; i <= N; i++) {
    t = a[b[i]]; // Read
    a[c[i]] = t; // Write
}
```

| ITERATION NUMBER | DEPENDENCY INFORMATION |
|---|---|
| 1 | NONE |
| 2 | NONE |
| 3 | NONE |
| 4 | NONE |
| 5 | NONE |
| 6 | NONE |
| 7 | NONE |
| 8 | DEPENDED ON BY 9 |
| 9 | DEPENDENT ON ITERATION 8 |
| 10 | DEPENDED ON BY 11 |
| 11 | DEPENDENT ON ITERATION 10 |
| 12 | NONE |
| 13 | NONE |
| 14 | NONE |
| 15 | NONE |
| 16 | NONE |
| 17 | DEPENDED ON BY 21 |
| 18 | NONE |
| 19 | NONE |
| 20 | NONE |
| 21 | DEPENDENT ON ITERATION 17 |
| 22 | NONE |
| 23 | NONE |
| 24 | NONE |
| 25 | NONE |
| 26 | NONE |
| 27 | NONE |
| 28 | NONE |
| 29 | NONE |
| 30 | NONE |
| 31 | NONE |
| 32 | NONE |

FIG. 1B

```
                                           200
      ┌─────────────────────────────────────────────────────────────────────┐
      │ VL = 16;     //16 is the maximum number of elements the architecture can
      │              //vectorize
      │
      │ start = 0;
202 → │ for (i =1; i <= N; i+=VL) {
      │         start = i;
204 → │         dependences = checkForConflict(&b[i], &c[i]);   //Returns conflicts between
      │                                                         //b[i] and c[i] from i to
      │                                                         //min(N, i+VL-1)
      │
206 → │    vpl:    // Vector Partitioning loop
208 → │            divide = getNextDependence(dependences, start); //Gets next
      │                                                            //conflict point;
      │
210 → │            Do partial vectorization from start to (divide – 1);
      │            Set start = divide;
212 → │            if (start <= min(N, i+VL-1))
      │                    goto vpl;    // branch b1
      │ } // end for
      └─────────────────────────────────────────────────────────────────────┘
```

| VECTOR | ITERATIONS | SIZE |
|--------|------------|------|
| A      | 1-8        | 8    |
| B      | 9-10       | 2    |
| C      | 11-16      | 6    |
| D      | 17-20      | 4    |
| E      | 21-32      | 12   |

FIG. 2B
(Prior Art)

```
// VL is the SIMD length

402 →  for (i =1; i<= N; i+=k) {       ↓ —— 404
           divide = getNextConflict(&b[i],&c[i],i,N);   //Get next conflict between
                                                       //b[i] & c[i] from i to
                                                       //min(N, i+VL-1);
406 →      Do partial vectorization from i...(divide – 1);
410 →      k = divide – i; // No. of elements partially vectorized in this phase } // end for
```

FIG. 4A

| VECTOR | ITERATIONS | SIZE |
|---|---|---|
| A | 1-8 | 8 |
| B | 9-10 | 2 |
| C | 11-20 | 10 |
| D | 21-32 | 12 |

FIG. 4B

```
// VL is the SIMD length
                    ← 602
for (i =1 ; i<= N; i+=k) {
        mask = getNextIndependentIterationSet(&b[i],&c[i],i,N);  //Get next set of
                                    ↑                            //unprocessed
                                    └──── 604                    //independent iterations
                                                                 //from i to min(N, i+VL-1);
              ← 606
        Do partial vectorization from i...MIN(N, i+VL-1) for iterations enabled by mask;
        k = (the first-occurring iteration starting from i that has not been processed) - i;
}           ↑
            └──── 610
```

FIG. 6A

| ITERATIONS | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| MASK | 1 | 1 | 1 | 1 | 1 | 1 | 1 | 1 | 0 | 1 | 0 | 1 | 1 | 1 | 1 | 1 |

FIG. 6B

| ITERATIONS | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|
| MASK | 1 | 0 | 1 | 0 | 0 | 0 | 0 | 0 | 1 | 1 | 1 | 1 | 0 | 1 | 1 | 1 |

FIG. 6C

| ITERATIONS | 21 | 22 | 23 | 24 | 25 | 26 | 27 | 28 | 29 | 30 | 31 | 32 | - | - | - | - |
|---|---|---|---|---|---|---|---|---|---|---|---|---|---|---|---|---|
| MASK | 1 | 0 | 0 | 0 | 1 | 1 | 1 | 1 | 1 | 1 | 1 | 1 | 0 | 0 | 0 | 0 |

FIG. 6D

| VECTOR | ITERATIONS | SIZE |
|---|---|---|
| A | 1-8, 10, 12-16 | 14 |
| B | 9, 11, 17-20, 22-24 | 9 |
| C | 21, 25-32 | 9 |

FIG. 6E

LOOP VECTORIZATION METHODS AND APPARATUS

FIELD OF THE DISCLOSURE

This disclosure relates generally to computing platforms and, more particularly, to loop vectorization methods and apparatus.

BACKGROUND

Some computing platforms attempt to improve machine level execution of code by translating the code according to vectorization techniques. For example, original code corresponding to an iterative loop may be converted into vectorized code to better utilize resources of the computing platform.

BRIEF DESCRIPTION OF THE DRAWINGS

FIG. 1A is pseudo-code representative of an example loop.

FIG. 1B is a table illustrating example dependencies between iterations of the example loop of FIG. 1A.

FIG. 2A is pseudo-code representative of a known technique for vectorizing the example loop of FIG. 1A.

FIG. 2B is a table including information related to vectors generated by the known technique of FIG. 2A.

FIG. 4A is pseudo-code representative of a first example vectorization of the loop of FIG. 1A generated by the first example loop vectorizer of FIG. 3.

FIG. 4B is a table including information related to vectors generated by the example loop vectorizer of FIG. 3.

FIG. 6A is pseudo-code representative of a second example vectorization of the loop of FIG. 1A generated by the second loop vectorizer of FIG. 5.

FIGS. 6B-D illustrate iterations of the loop of FIG. 1A that are analyzed by the second example loop vectorizer of FIG. 5 and corresponding masks generated by the example mask generator of FIG. 5.

FIG. 6E is a table including information related to vectors generated by the second example loop vectorizer of FIG. 5.

DETAILED DESCRIPTION

Figure 3:
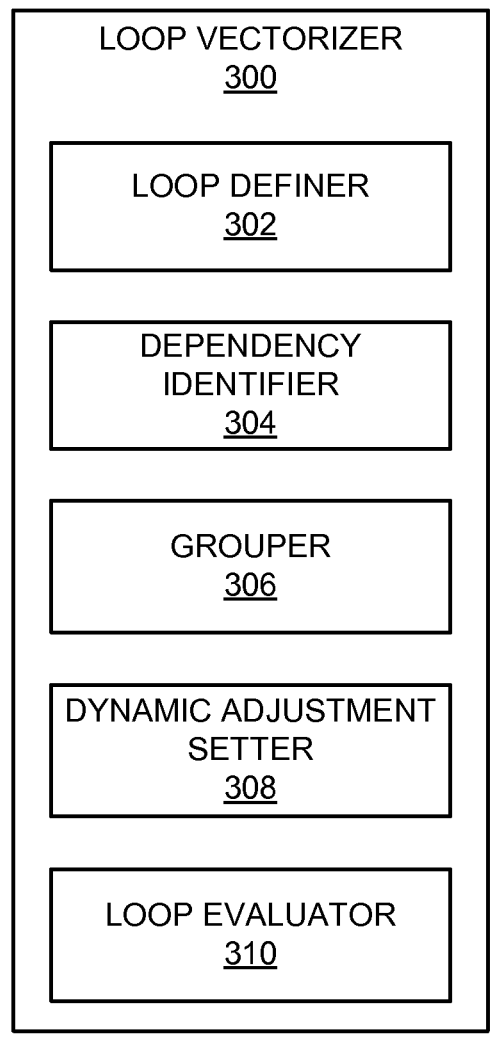
FIG. 3 is a block diagram of a first example loop vectorizer constructed in accordance with teachings of this disclosure.

To take advantage of parallel processing capabilities (e.g., single instruction multiple data (SIMD) extensions) of computing platforms, original code is sometimes converted into vectorized code. In some examples, vectorization of the original code results in parallel (e.g., simultaneous) execution of at least two code elements that would otherwise be executed serially according to the original code. For example, if the original code represents a loop having a plurality of iterations that would be executed serially according to the original code, iterations of the loop can be vectorized such that a first iteration of the loop is executed at the same time as a second iteration of the loop. Vectorizing first and second code elements involves combining operations associated with the first and second code elements into a single register, such as a vector register capable of implementing SIMD extensions. To vectorize the iterations of the loop, the original code representing the loop is converted (e.g., rewritten, reconfigured, translated, etc.) according to one or more vectorization techniques and/or algorithms.

Such vectorization techniques and/or algorithms are complicated by a potential for data dependencies in the code. A data dependency exists when an operand (e.g., a target register) of one operation depends on completion or resolution of another operation. In other words, when one operation is dependent on completion of another operation, proper execution of the code involves waiting to execute the dependent operation until the depended-on operation is executed and/or verifying that the depended-on operation has been executed before executing the dependent operation. Failure to account for data dependencies and/or failure to properly process data dependencies can result in improper values being stored in registers, faults, errors, etc.

FIG. 1A includes pseudo-code which illustrates an example loop 100 that can be vectorized such that two or more iterations of the loop are executed simultaneously. A processing platform executing the example loop 100 of FIG. 1A has vector registers that enable more than one operation and/or more than one portion of an operation to be executed simultaneously, even though the corresponding original code is written in a serial fashion. By facilitating the parallel execution of operations, vector registers enable an improvement (e.g., optimization) of the example loop 100 that reduces execution latency. However, some aspects or iterations of the example loop 100 may include one or more data dependencies. For example, the loop 100 of FIG. 1A has a read operation 102 and a write operation 104. The read operation 102 of FIG. 1A obtains a value from memory location a[b[i]] and the write operation 104 of FIG. 1A writes a value to memory location a[c[i]]. A first iteration (i1) of the example loop 100 may write to location a[c[i]] and a second, different iteration (i2) may read the same location a[b[i]] when b[i] equates to c[i]. In such instances, a data dependency exists between the first iteration (i1) and the second iteration (i2).

In the illustrated example of FIG. 1A, the loop 100 is being executed on an architecture having a vector length of sixteen (16) elements (e.g., bytes). The vector length determines how many elements (e.g., bytes) a corresponding vector register can process at a time (e.g., simultaneously). When the vector registers implement SIMD extensions, the vector length corresponds to the length of the particular SIMD implementation. Vector length can be different based on, for example, the architecture on which the vectorization occurs. For purposes of illustration, an example instance of the loop 100 is discussed below. The example instance of the loop 100 has thirty-two (32) iterations (i.e., N=32), some of which have data dependencies. In the example instance of the loop 100 discussed below, the data dependencies are identified in a table 106 illustrated in FIG. 1B. As shown in the table 106, iterations one (1) through eight (8) have no dependencies, iteration nine (9) is dependent on iteration eight (8), iteration eleven (11) is dependent on iteration ten (10), iterations twelve (12) through twenty (20) have no dependencies, iteration twenty-one (21) is dependent on iteration seventeen (17), and iterations twenty-two (22) through thirty-two (32) have no dependencies. Thus, iteration nine (9) cannot be executed simultaneously with iteration eight (8). Put another way, iteration nine (9) cannot be combined into the same vector as iteration eight (8). Analogous restrictions exist for the other dependencies identified in the table 106 of FIG. 1B.

To account for such dependencies, known vectorization techniques break the vectorization into a plurality of partial vectorizations such that the dependent operations are not executed in parallel with the depended-on operations. A known vectorization technique that accounts for the data dependencies described above is illustrated in FIG. 2A. In particular, FIG. 2A illustrates code 200 generated by the known vectorization technique. Notably, the example code 200 of FIG. 2A includes a loop nest. In the code 200 of FIG. 2A, an outer loop 202 processes a fixed number of scalar loop iterations depending on the vector length, which is fixed or static. In other words, after each iteration of the outer loop 202, the value of 'i' is adjusted (e.g., increased, decreased, increment, decremented, etc.) by the value of the vector length, which is sixteen (16) in the instant example as described above. The code 200 of FIG. 2A also includes a data dependency operation 204 that identifies dependencies between iterations. In the example of FIG. 2A, the data dependency operation 204 determines whether a conflict exists between b[i] and c[i] for a certain range. A conflict exists when, for example, a read operation depends on a preceding write operation, when a write operation depends on preceding read operation, etc. The length of the analyzed range in FIG. 2A corresponds to the lesser of the vector length and the upper limit (N) of the outer loop 202. Consideration of the upper limit (N) accounts for instances in which the final iteration of the outer loop 202 is not a full vector length. Thus, with reference to the example table 106 of FIG. 1B, during a first iteration of the outer loop 202 the data dependency operation 204 checks for dependencies in iterations one (1) through sixteen (16) of the original code 100 of FIG. 1A. During a second iteration of the outer loop 202, the data dependency operation 204 checks for dependencies in iterations seventeen (17) through thirty-two (32) of the original code 100 of FIG. 1A. Had the original code 100 included thirty-seven (37) iterations, the data dependency operation 204 would also check for dependencies in iterations thirty-three (33) through thirty-seven (37) during a third iteration of the outer loop 202.

In the example of FIG. 2A, a vector partitioning loop 206 is nested within the outer loop 202. For each iteration of the outer loop 202, the vector portioning loop 206 groups or combines non-dependent iterations of the currently analyzed range (e.g., iterations that do not exhibit data dependencies in the range of iteration one (1) through iteration sixteen (16)) or iterations that do not exhibit data dependencies in the range of iteration seventeen (17) through iteration thirty-two (32)) into vectors. To do so, the example vector partitioning loop 206 of FIG. 2A divides the analyzed range of iterations based on points in the range at which a dependency occurs. An assignment statement 208 of the example pseudo-code utilizes a function (getNextDependence) that identifies the next dependent iteration of the analyzed range and assigns that iteration to a variable 'divide.' In particular, the function utilized by the assignment statement 208 analyzes the dependencies calculated by the dependency operation 204. Thus, during the first iteration of the outer loop 202 (i.e., when the outer loop 202 is analyzing iterations one (1) through sixteen (16)), 'divide' is first assigned the value nine (9) due to the dependency between iteration nine (9) and iteration eight (8). A vectorization operation 210 then vectorizes the iterations occurring prior to the first occurring dependency. As shown in FIG. 2A, the vectorization operation 210 vectorizes the iterations from 'start' to '(divide−1).' Thus, during the first iteration of the outer loop (i.e., when the outer loop 202 is analyzing iterations one (1) through sixteen (16) of the loop), the vectorization operation 210 groups iterations one (1) through (8) together to form a first vector. The first vector formed by the example pseudo-code of FIG. 2A is shown in a table 214 of FIG. 2B as Vector A, which has a size of eight (8) elements.

The variable 'start' is then adjusted such that a subsequent iteration (if any) of the nested loop operates on the iterations following the identified dependency (as previously determined by the function 'getNextDependence'). To continue the example above, the variable 'start' is set to a value of nine (9) because the variable 'divide' currently has a value of nine (9). In the example of FIG. 2A, a conditional statement 212 determines whether each iteration of the currently analyzed range of iterations of the outer loop 202 has been considered (e.g., processed by the vectorization operation 210). If so, the next iteration (if any) of the outer loop 202 is executed. Otherwise, the example vector portioning loop 206 is executed again.

As described above, a first iteration of the vector partitioning loop 206 results in iterations one (1) through (8) of the original code being vectorized (e.g., grouped together for simultaneous execution). A second iteration of the vector portioning loop 206 is then executed because only iterations one (1) through eight (8) have been processed. Thus, the assignment statement 208 is executed and the next dependency of the currently analyzed range of iterations is identified. As reflected in the example table 106 of FIG. 1B, the next dependency after the current value of the variable 'start' (which is nine (9)) is iteration eleven (11), which has a dependency on iteration ten (10). Accordingly, the variable 'divide' is assigned a value of eleven (11). Thus, the vectorization operation 210 results in iterations nine (9) and ten (10) being vectorized together to form a second vector. The second vector formed by the pseudo-code of FIG. 2A is identified in the table 214 of FIG. 2B as Vector B, which has a size of two (2) elements. The variable 'start' is then adjusted (e.g., increased) to a value of eleven (11) and the code branches backs to the vector partitioning loop 206 based on the conditional statement 212 (e.g., because eleven (11) is less than sixteen (16). Thus, first and second iterations of the vector partitioning loop 206 result in a first vector including iterations one (1) through eight (8) and a second vector including iterations nine (9) and ten (10) of the example loop 100 of FIG. 1A.

A third iteration of the vector partitioning loop 206 is then executed. However, according to the table 106 of FIG. 1B, the currently analyzed range of iterations of the original code 100 (e.g., iterations one (1) through sixteen (16)) does not include another dependency (e.g., after the dependency of iteration eleven (11) on iteration ten (10)). Thus, the variable 'divide' is assigned a value corresponding to the last iteration of the currently analyzed range of iterations such that the vector partitioning loop 206 is not executed again via the conditional statement 212.

As described above, the currently analyzed range of iterations of the original code 100 corresponds to the current iteration of the outer loop 202. To continue the above example, the currently analyzed iterations of the original code 100 are iterations one (1) through sixteen (16). Iterations one (1) through ten (10) have been processed and the results include first and second vectors (Vectors A and B in the table 214 of FIG. 2B). Accordingly, the vectorization operation 210 is performed on iterations eleven (11) through sixteen (16), which results in iterations eleven (11) through sixteen (16) being vectorized together to form a third vector. The third vector formed by the pseudo-code of FIG. 2A is identified in the table 214 of FIG. 2B as Vector C, which has a size of six (6) elements. Because the conditional statement 212 evaluates to false, the pseudo-code of FIG. 2A returns to the outer loop 202 instead of the vector partitioning loop 206.

A second iteration of the outer loop 202 is then executed with 'i' set such that iterations seventeen (17) through thirty-two (32) of the original code 100 for the currently analyzed range for the second iteration of the outer loop 202. Following the pseudo-code 200 of FIG. 2A in the manner described above and in accordance with the dependencies identified in the table 106 of FIG. 1B, the second iteration of the outer loop results in a fourth vector including iterations seventeen (17) through twenty (20) and a fifth vector including iterations twenty-one (21) through thirty-two (32). The fourth vector formed by the pseudo-code of FIG. 2A is identified in the table 214 of FIG. 2B as Vector D, which has a size of four (4). The fifth vector formed by the pseudo-code of FIG. 2A is identified in the table 214 of FIG. 2B as Vector E, which has a size of twelve (12) elements.

In sum, the known loop vectorization technique represented by the code 200 of FIG. 2A generates the vectors shown the table 214 of FIG. 2B. Notably, the third execution of the vectorization operation 212 of FIG. 2A generates a vector (Vector C in the table 214) that is smaller than the vector length of the registers (e.g., the maximum number of elements in a vector) despite the absence of a data dependency in the third iteration described above. In other words, using the known technique represented by the code 200 of FIG. 2A, the opportunity for vectorization or combination of iterations of the loop is limited by the vector length. This limitation arises from the definition of the outer loop 202 in the code 200 of FIG. 2A and the vectorization operation 212 being nested inside the outer loop 202. Because the adjustment value of the outer loop 212 (i=+VL) corresponds to the vector length, which is fixed, the code 200 of the known technique creates boundaries in the iterations. In the example described above in which the vector length is sixteen (16), boundaries to vectorization exist at iterations sixteen (16), thirty-two (32), etc. As a result of the boundaries created by the code 200 of the known technique, iterations are not vectorized across the boundaries, even though no data dependencies exist that would otherwise cause partial vectorization. As demonstrated in FIGS. 2A and 2B, the boundaries created by the known technique represented by the code 200 lead to the third vector (Vector C) having to be capped at a size of six (6) and at iteration sixteen (16) despite the absence of a dependency at iteration sixteen (16) due to the boundary created by the code 200 at iteration sixteen (16).

Example methods, apparatus, and/or articles of manufacture disclosed herein recognize that the boundaries created by the known technique in the iterations of loops can be detrimental to performance. In particular, vectors of a greater size (e.g., closer to the vector length) are often more beneficial to the performance of the code than vectors of a smaller size because more operations are executed simultaneously. Furthermore, a lesser number of vectors can be more beneficial to the performance of the code than a larger number of vectors because less processing cycles are necessary to execute the entirety of the code. Example methods, apparatus, and/or articles of manufacture disclosed herein increase the size of vectors generated by a loop vectorization process and decrease the number of vectors generated by the loop vectorization process. As described in detail below, example, methods, apparatus, and/or articles of manufacture disclosed herein accomplish these improvements by eliminating the boundaries described above in connection with FIGS. 2A and 2B. Further, example methods, apparatus, and/or articles of manufacture disclosed herein accomplish these improvements by utilizing a single loop rather than nested loops.

Example methods, apparatus, and/or articles of manufacture disclosed herein also recognize a difficulty in predicting whether or not the branch associated with the conditional statement 212 will be taken. That is, the nested vector partitioning loop 206 of FIG. 2A may or may not be re-executed based on locations of the dependencies in the original code 100. Because the dependencies are difficult to predict in many instances, the determination of whether the branch will be taken is also difficult to predict. Additional or alternative operations and/or mechanisms (e.g., branch prediction mechanisms) may rely on such predictions. Thus, a reduction in mispredictions associated with the branching vector partitioning loop 206 is beneficial. As described in detail below, example methods, apparatus, and/or articles of manufacture disclosed herein reduce and/or eliminate branch mispredictions by eliminating the boundaries described above in connection with FIGS. 2A and 2B. In some examples, the boundaries are eliminated by utilizing a single loop rather than having an inner loop nested inside an outer loop.

Figure 5:
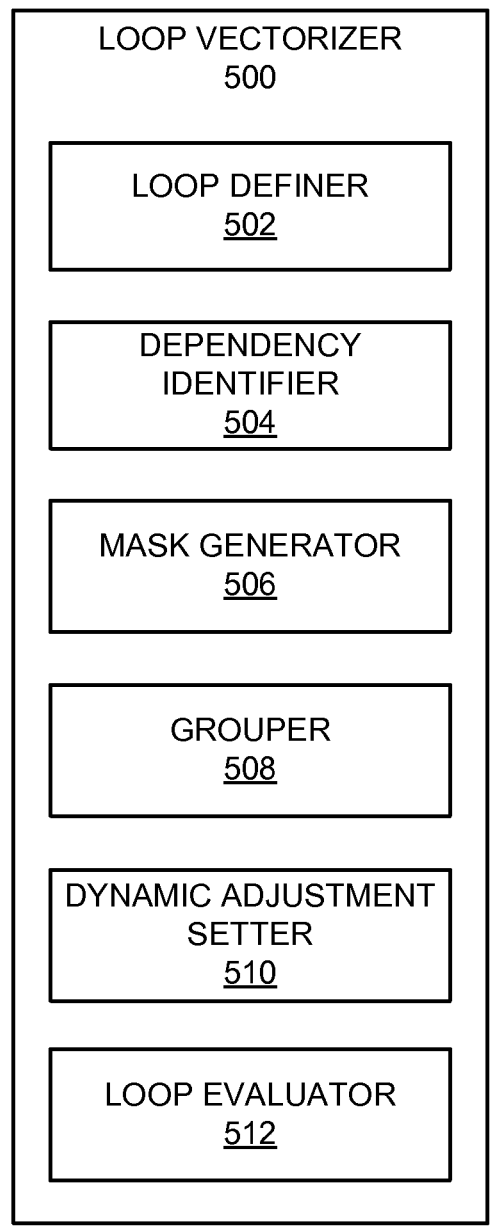
FIG. 5 is a block diagram of a second example loop vectorizer constructed in accordance with teachings of this disclosure.

FIG. 3 is a block diagram of a first example loop vectorizer 300 constructed in accordance with teachings of this disclosure. A second example loop vectorizer 500 constructed in accordance with teachings of this disclosure is illustrated in FIG. 5 and discussed further below. The first and second example loop vectorizers 300, 500 are described below in connection with the example loop 100 of FIG. 1A and the example dependency information of the table 106 of FIG. 1B. However, the first and second example loop vectorizers 300, 500 of FIGS. 3 and 5 can be utilized in connection with additional or alternative loops and/or dependency configurations. The first and second example loop vectorizers 300, 500 of FIGS. 3 and 5 vectorize the example loop 100 of FIG. 1A in more efficient and accurate manners than known loop vectorization techniques. The first example loop vectorizer 300 of FIG. 3 is described below in connection with example pseudo-code 400 of FIG. 4A performed by the first example loop vectorizer 300 of FIG. 3. The second example loop vectorizer 500 of FIG. 5 is described below in connection with example pseudo-code 600 of FIG. 6A performed by the second example loop vectorizer 500 of FIG. 5.

The first example loop vectorizer 300 of FIG. 3 includes a loop definer 302 to set parameters of a loop 402 (FIG. 4A). As shown in FIG. 4A, the loop definer 302 defines the loop 402 to have an adjustment value of 'k.' In the illustrated example, 'k' is a value which is dynamically assigned in the body of the loop 402. That is, the amount of adjustment (e.g., increase, decrease, increment, decrement, etc.) experienced by the loop 402 after each iteration is dynamic (e.g., may be different from one iteration to another). In contrast, the known vectorization technique represented in FIG. 2A employs a fixed adjustment value that does not vary from one iteration to another. As described above, the fixed adjustment value of FIG. 2A and the conditional statement 212 of FIG. 2A lead to boundaries across which vectorization is restricted. The example pseudo-code 400 of FIG. 4A performed by the first example loop vectorizer 300 of FIG. 3 does not have such boundaries and, thus, is not confined by such boundaries for purposes of vectorizing iterations of the original code 100.

The example loop vectorizer 300 of FIG. 3 includes a dependency identifier 304 to determine which iteration (if any) of the original code 100 corresponds to the next dependency. In the illustrated example, the dependency identifier 304 implements a function referred to as 'getNextConflict' 404 in FIG. 4A, which returns a value to be assigned to the variable 'divide' that corresponds to the next (e.g., lowest unprocessed) dependency in the original code 100. According to the example table 106 of FIG. 1A, the first dependency occurs with iteration nine (9), which is dependent on iteration eight (8). Therefore, during the first iteration of the loop 402 of FIG. 4A, the variable 'divide' is assigned a value of nine (9). A grouper 306 of the example loop vectorizer 300 of FIG. 3 performs a vectorization of the iterations up to the dependency identified by the dependency identifier 304. In the illustrated example, the grouper 306 of the example loop vectorizer 300 groups consecutive independent iterations together to form a vector, as shown at reference numeral 406 of FIG. 4A. Thus, during the first iteration of the loop 402, the example grouper 306 groups iterations one (1) through (8) to form a first vector due to the dependency of iteration (9) on iteration eight (8). The first vector is identified in a table 408 of FIG. 4B as Vector A, which includes iterations one (1) through (8) and has a size of eight (8).

The first example loop vectorizer 300 of FIG. 3 includes a dynamic adjustment setter 308 to set a value of 'k' for a current iteration of the loop 402. The dynamic adjustment setter 308 sets the value of 'k' depending on how many iterations of the original code 100 were vectorized by the grouper 306 in the current iteration of the loop 402. The assignment of the value of 'k' is shown at reference numeral 410 of FIG. 4A. As a result of the dynamic adjustment of 'k,' the subsequent iteration of the loop 402 of FIG. 4A will begin at the next unvectorized iteration of the original code 100. As described above, the first iteration of the loop 402 vectorizes iterations one (1) through (8) according to the example table 106 of FIG. 1B. Accordingly, the subsequent iteration of the loop 402 begins on iteration nine (9) of the original code 100. This is made possible via the parameters definitions set by the example loop definer 302 of the first example loop vectorizer 300 of FIG. 3.

The first example loop vectorizer 300 of FIG. 3 includes a loop evaluator 310 to evaluate conditions according to the parameters of the loop 402. In the illustrated example, as long as 'i' is less than or equal to N (e.g., thirty-two (32) in the illustrated example), the loop evaluator 310 determines that another iteration of the loop 402 is to be executed. Thus, a second iteration of the loop 402 is executed to evaluate the iterations of the original code 100 beginning with iteration nine (9) of the original code 100. The example dependency identifier 304 determines (at reference numeral 404 of FIG. 4A) that the next dependency occurs with iteration eleven (11), which is dependent on iteration ten (10). Accordingly, the grouper 306 groups iteration nine (9) with iteration (10) to form a second vector (at reference numeral 406 of FIG. 4A). The second vector is identified in the table 408 of FIG. 4B as Vector B, includes iterations nine (9) through ten (10), and has a size of two (2) elements. The example dynamic adjustment setter 308 sets the value of 'k' (at reference numeral 410 of FIG. 4A) to two (2) to reflect that two iterations of the original code have been processed (e.g., vectorized). When the loop 402 is adjusted (e.g., increased) accordingly, the value of 'i' is still less than 'N' and, thus, a third iteration of the loop 402 is executed.

The third iteration of the loop 402 evaluates iterations beginning with iteration eleven (11) due to the new value of 'i.' The dependency identifier 304 determines (at reference numeral 404 of FIG. 4A) that iteration twenty-one (21) is the next dependent iteration. Accordingly, iterations eleven (11) through twenty (20) can be vectorized to execute in parallel. As such, the example grouper 306 groups iterations eleven (11) through twenty (20) into a third vector (at reference numeral 406 of FIG. 4A). The third vector is identified in the table 408 of FIG. 4B as Vector C, includes iterations eleven (11) through twenty (20), and has as a size of ten (10) elements.

Notably, during the third iteration of the loop 402, the example code 400 of FIG. 4A is not constrained to evaluating iterations up to iteration sixteen (16), as is the case when using the known technique of FIG. 2A. Instead, the first example loop vectorizer 300 of FIG. 3 enables a larger vector to be generated during the third iteration of the loop 402. That is, the first example loop vectorizer 300 of FIG. 3 does not cap the available iterations for vectorization based on a boundary created by loop parameters, as is the case in the known technique illustrated in FIG. 2A. As shown in the table 404 of FIG. 4B, Vector C created by the first example loop vectorizer 300 disclosed herein has a size of ten (10) elements. In contrast, Vector C of the table 214 of FIG. 2B created by the known technique of FIG. 2A has a size of six (6) elements. Because performance is often improved with a greater number of operations being executed in parallel, the first example loop vectorizer 300 of FIG. 3 improves performance of the original code 100.

During a fourth iteration of the loop 402, the example dependency identifier 304 of FIG. 3 does not identify (at reference numeral 404 of FIG. 4A) a dependency beyond the dependency of iteration twenty-one (21) on iteration seventeen (17). As the fourth iteration of the loop 402 begins with iteration twenty-one (21), the grouper 306 vectorizes iterations twenty-one (21) through thirty-two (32) to form a fourth vector (at reference numeral 406 of FIG. 4A). The fourth vector is identified in the table 408 of FIG. 4B as Vector D, includes iterations twenty-one (21) through thirty-two (32), and has a size of twelve (12) elements. The example dynamic adjustment setter 308 sets the value of 'k' (at reference numeral 410 of FIG. 4A) to twelve (12) to reflect that twelve iterations of the original code have been processed (e.g., vectorized). When the loop 402 is adjusted (e.g., increased) accordingly, the value of 'i' is no longer less than or equal to 'N' and, thus, the loop 402 ends.

The table 408 of FIG. 4B illustrates the four vectors (A, B, C and D) generated by the first example loop vectorizer 300 of FIG. 3. As shown in FIG. 4B, the Vectors A-D have respective sizes of eight (8), two (2), ten (10) and twelve (12). Reference to the table 106 of FIG. 1B shows that none of the vectors of the table 408 of FIG. 4B include iterations that depend on each other. As shown in the table 408 of FIG. 4B, dependent iteration nine (9) is in a different vector than depended-on iteration eight (8), dependent iteration eleven (11) is in a different vector than depended-on iteration ten (10), and dependent iteration twenty-one (21) is in a different vector than depended-on iteration seventeen (17). Thus, in comparison to the vectors generated by the known technique of FIGS. 2A and 2B, the first example loop vectorizer 300 of FIG. 3 generates less vectors, at least one of which is greater in size (and, thus, executes more operations simultaneously) relative to the corresponding vectors of FIG. 2B. Moreover, the first example loop vectorizer 300 of FIG. 3 does not include the branch of the pseudo-code 200 of FIG. 2A and, thus, does not cause the system to incur branch mispredictions.

While an example manner of implementing the first example loop vectorizer 300 has been illustrated in FIG. 3, one or more of the elements, processes and/or devices illustrated in FIG. 3 may be combined, divided, re-arranged, omitted, eliminated and/or implemented in any other way. Further, the example loop definer 302, the example dependency identifier 304, the example grouper 306, the example dynamic adjustment setter 308, the example loop evaluator 310 and/or, more generally, the first example loop vectorizer 300 of FIG.

3 may be implemented by hardware, software, firmware and/or any combination of hardware, software and/or firmware. Thus, for example, any of the example loop definer 302, the example dependency identifier 304, the example grouper 306, the example dynamic adjustment setter 308, the example loop evaluator 310 and/or, more generally, the first example loop vectorizer 300 of FIG. 3 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example loop definer 302, the example dependency identifier 304, the example grouper 306, the example dynamic adjustment setter 308, the example loop evaluator 310 and/or, more generally, the first example loop vectorizer 300 of FIG. 3 are hereby expressly defined to include a tangible computer readable storage medium such as a memory, DVD, CD, Blu-ray, etc. storing the software and/or firmware. Further still, the example loop vectorizer 300 of FIG. 3 may include one or more elements, processes and/or devices in addition to, or instead of, those illustrated in FIG. 3, and/or may include more than one of any or all of the illustrated elements, processes and devices.

The second example loop vectorizer 500 of FIG. 5 also executes code to vectorize a loop (e.g., of the original code 100 of FIG. 1A) in a more efficient and accurate manner than known techniques. The second example loop vectorizer 500 is described in connection with example pseudo-code 600 of FIG. 6A. Like the first example loop vectorizer 300 of FIG. 3, the second example loop vectorizer 500 includes a loop definer 502 to set parameters of a loop 602 (FIG. 6A). As shown in FIG. 6A, the loop definer 502 defines the loop 602 to have an adjustment value of 'k.' In the illustrated example, 'k' is a variable having a value that is dynamically assigned in the body of the loop 602. That is, the amount of adjustment (e.g., increase, decrease, increment, decrement, etc.) experienced by the loop 602 after each iteration is dynamic (e.g., may be different from one iteration of the loop 602 to another).

The second example loop generator 500 of FIG. 5 includes a dependency identifier 504 to identify data dependencies in a set of iterations. In particular, the example dependency identifier 504 of FIG. 5 determines which iterations are dependent on at least one other iteration in a set defined by the current value of 'i' and a minimum of 'N' and the value of '(i+VL−1)'. In the illustrated example, the value of 'N' is thirty-two (32) and the value of 'i' is initially one (1). Thus, for a first iteration of the loop 602 of FIG. 6A, the set of iterations analyzed by the dependency identifier 504 corresponds to the first sixteen (16) iterations of the original loop 100 of FIG. 1A. According to the table 106 of FIG. 1B, the example dependency identifier 504 of FIG. 5 determines that the first iteration of loop 602 is associated with dependent iteration nine (9) and dependent iteration eleven (11).

The second example loop vectorizer 500 FIG. 5 includes a mask generator 506 to generate a mask based on the dependenc(ies) identified by the dependency identifier 504 for the current set of iterations. The mask generated by the example mask generator 506 of FIG. 5 is a string of ones (1s) and, if any dependencies are present, zeroes (0s). Each bit of the string generated by the example mask generator 506 of FIG. 5 corresponds to one of the iterations of the currently analyzed set of iterations (e.g., iterations one (1) through sixteen (16) in the first iteration of the loop 602). The example mask generator 506 of FIG. 5 sets bits corresponding to independent iterations to one (1) and bits corresponding to dependent iterations to zero (0). Further, the example mask generator 506 of FIG. 5 determines which of the iterations have already been processed (e.g., assigned to a vector as described below). If an independent iteration has already been processed, the example mask generator 506 of FIG. 5 sets the corresponding bit to zero (0). In some examples, setting a bit corresponding to an already processed iteration to zero (0) involves overwriting a value of one (1) for that bit. Thus, the mask generated by the example mask generator 506 of FIG. 5 includes a one (1) for each unprocessed independent iteration of the currently analyzed set of iterations. All other bits are zeroes (0s). Accordingly, the example dependency identifier 504 and the example mask generator 506 of FIG. 5 implement a function (e.g., referred to as 'getNextIndependentIterationSet' 604 in the example code 600 of FIG. 6A) to assign a string to a variable 'mask' in the example pseudo-code 600 of FIG. 6A. In the illustrated example, the function 'getNextIndependentIterationSet' includes at least a portion of the functionality provided by the example dependency identifier 504 of FIG. 5.

For the first iteration of the loop 602, in accordance with the table 106 of FIG. 1B, the example mask generator 506 of FIG. 5 generates the following mask: '1111111101011111,' which is assigned to the variable 'mask.' The zeroes (0s) of the mask correspond to dependent iteration nine (9) and dependent iteration eleven (11). Because no iterations have been processed before the first iteration of the loop 602, none of the bits are set to zero (0) due to a corresponding iteration having been processed. The iterations of the original code 100 that are analyzed in the first iteration of the loop 602 are shown in FIG. 6B, along with the corresponding mask that is generated by the example mask generator 506 of FIG. 5.

The second example loop vectorizer 500 of FIG. 5 includes a grouper 508 to vectorize iterations of the currently analyzed set of iterations that are not dependent on each other and have not already been vectorized. To vectorize the independent, unprocessed iterations, the example grouper 508 assigns the independent iterations to a single vector (e.g., implemented by a vector register) (at reference numeral 606 of FIG. 6A). In the illustrated example of FIG. 5, the grouper 508 vectorizes the iterations corresponding to ones (1s) of the current string assigned to the string 'mask.' As described above, for the first iteration of the loop 602, the string 'mask' defines iterations one (1) through eight (8), iteration ten (10), and iterations twelve (12) through sixteen (16) as unprocessed and independent. Accordingly, the example grouper 508 of FIG. 5 vectorizes iterations one (1) through eight (8), iteration ten (10), and iterations twelve (12) through sixteen (16) into a first vector. The first vector is identified in a table 608 of FIG. 6E as Vector A and has a size of fourteen (14) elements.

The second example loop vectorizer 500 of FIG. 5 includes an dynamic adjustment setter 510 to set a dynamic value 'k' of the example code 600 of FIG. 6A. The example dynamic adjustment setter 510 of FIG. 5 determines how many consecutive iterations from the beginning of the currently analyzed set of iterations were vectorized (at reference numeral 610 of FIG. 6A). In other words, the example dynamic adjustment setter 510 of FIG. 5 determines which iteration of the currently analyzed set of iterations corresponds to the first occurring bit in the mask associated with a dependency that has not yet been vectorized. To do so, the example dynamic adjustment setter 510 analyzes the variable 'mask' to identify the first-occurring zero (0) that does not correspond to a processed iteration. In other words, the example dynamic adjustment setter 510 identifies which bit in the mask corresponds to the first-occurring iteration that has not been vectorized. As a result, the example dynamic adjustment setter 510 generates a number representative of a desired starting point in the iterations of the original code 100 for the subsequent iteration of the loop 602. To continue the above example in which iterations one (1) through eight (8), iteration ten (10), and iterations twelve (12) through sixteen (16) were vectorized, the example dynamic adjustment setter 510 determines that the first occurring zero (0) corresponding to a vector that has not been vectorized is associated with iteration nine (9). Because the current value of 'i' is one (1), the example dynamic adjustment setter 510 sets the value of 'k' to eight (8) (e.g., nine (9) minus one (1)).

When the variable 'i' of the loop 602 has been adjusted (e.g., increased) according to the dynamic value of 'k,' a second iteration of the loop 602 is executed, as the value of 'i' remains less than 'N' according to an evaluation performed by a loop evaluator 512 of the second example loop vectorizer 500. Due to the dynamic adjustment of 'i,' the set of iterations analyzed in the second iteration of the loop 602 corresponds to iterations nine (9) through twenty-four (24). For the second iteration of the loop 602, in accordance with the table 106 of FIG. 1B, the example mask generator 506 of FIG. 5 generates the following mask: '1010000011110111,' which is assigned to the variable 'mask' (at reference numeral 604 of FIG. 6A). The zeroes (0s) of the mask correspond to iteration ten (10) (because ten (10) has already been vectorized), iterations twelve (12) through sixteen (16) (because twelve (12) through sixteen (16) have already been vectorized), and iteration twenty-one (21) (because it depends on iteration seventeen (17)). The iterations of the original code 100 that are analyzed in the second iteration of the loop 602 are shown in FIG. 6C, along with the corresponding mask generated by the example mask generator 506 of FIG. 5. The example grouper 508 references the mask and vectorizes iterations corresponding to the ones (1s) of the mask (at reference numeral 606 of FIG. 6A). As shown in the table 608 of FIG. 6E, the example grouper 508 assigns iterations nine (9), eleven (11), seventeen (17) through twenty (20), and twenty-two (22) through twenty-four (24) to a second vector, which is identified in table 608 of FIG. 6E as Vector B and has a size of nine (9) elements.

The example dynamic adjustment setter 510 sets the dynamic value 'k' of the example pseudo-code 600 of FIG. 6A according to how many consecutive iterations from the beginning of the currently analyzed set of iterations were vectorized (at reference numeral 610 of FIG. 6A). To continue the above example, the first-occurring zero (0) that does not correspond to a processed (e.g., vectorized) iteration is the bit corresponding to iteration twenty-one (21). Thus, the example dynamic adjustment setter 510 sets the value of 'k' to twelve (12) (e.g., twenty-one (21) minus nine (9)).

In the illustrated example, when the value of 'i' in the loop 602 has been increased by twelve (12), a third iteration of the loop 502 is executed, as the value of 'i' is twenty-one (21), which is less than 'N' according to an evaluation performed by a loop evaluator 512. Due to the dynamic adjustment of 'i,' the iterations of the original code 100 analyzed in the third iteration of the loop 602 corresponds to iterations twenty-one (21) through thirty-two (32). For the third iteration of the loop 602, in accordance with the table 106 of FIG. 1B, the example mask generator 506 of FIG. 5 generates the following mask: '1000111111110000,' which is assigned to the variable 'mask' (at reference numeral 604 of FIG. 6A). The zeroes (0s) of the mask correspond to iteration twenty-two (22) through twenty-four (24) (because twenty-two (22) through twenty-four (24) have already been vectorized) and iterations beyond the value of 'N,' which is thirty-two (32). The iterations of the original code 100 that are analyzed in the third iteration of the loop 602 are shown in FIG. 6D, along with the corresponding mask that is generated by the example mask generator 506 of FIG. 5. The example grouper 508 references the mask and vectorizes iterations corresponding to the ones (1s) of the mask. As shown in the table 608 of FIG. 6E, the example grouper 508 assigns iterations twenty-one (21) and twenty-five (25) through thirty-two (32) to a third vector, which is identified in the table 608 of FIG. 6E as Vector C and has a size of nine (9) elements.

The example dynamic adjustment setter 510 sets the dynamic value 'k' of the example pseudo-code 600 of FIG. 6A according to how many consecutive iterations from the beginning of the currently analyzed set of iterations were vectorized. To continue the above example, the first-occurring zero (0) that does not correspond to a processed iteration is the thirty-third iteration. Thus, the example dynamic adjustment setter 510 sets the value of 'k' to twelve (12) (e.g., thirty-three (33) minus twenty-one (21)). In the illustrated example, when the loop 602 has been increased by twelve (12), the loop ends, as the value of 'i' is thirty-three (33), which is greater than 'N' according to an evaluation performed by a loop evaluator 512.

Thus, the second example loop vectorizer 500 of FIG. 5 has generated three (3) vectors as opposed to the five (5) vectors generated by the known technique illustrated in FIGS. 2A and 2B. Moreover, the size of the vectors generated by the second example loop vectorizer 500 of FIG. 5 are greater than their counterpart vectors generated by the known technique illustrated in FIGS. 2A and 2B.

While an example manner of implementing the second example loop vectorizer 500 has been illustrated in FIG. 5, one or more of the elements, processes and/or devices illustrated in FIG. 5 may be combined, divided, re-arranged, omitted, eliminated and/or implemented in any other way. Further, the example loop definer 502, the example dependency identifier 504, the example mask generator 506, the example grouper 508, the example dynamic adjustment setter 510, the example loop evaluator 512 and/or, more generally, the second example loop vectorizer 500 of FIG. 5 may be implemented by hardware, software, firmware and/or any combination of hardware, software and/or firmware. Thus, for example, any of the example loop definer 502, the example dependency identifier 504, the example mask generator 506, the example grouper 508, the example dynamic adjustment setter 510, the example loop evaluator 512 and/or, more generally, the second example loop vectorizer 500 of FIG. 5 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example loop definer 502, the example dependency identifier 504, the example mask generator 506, the example grouper 508, the example dynamic adjustment setter 510, the example loop evaluator 512 and/or, more generally, the second example loop vectorizer 500 of FIG. 5 are hereby expressly defined to include a tangible computer readable storage medium such as a memory, DVD, CD, Blu-ray, etc. storing the software and/or firmware. Further still, the second example loop vectorizer 500 of FIG. 5 may include one or more elements, processes and/or devices in addition to, or instead of, those illustrated in FIG. 5, and/or may include more than one of any or all of the illustrated elements, processes and devices.

Figure 7:
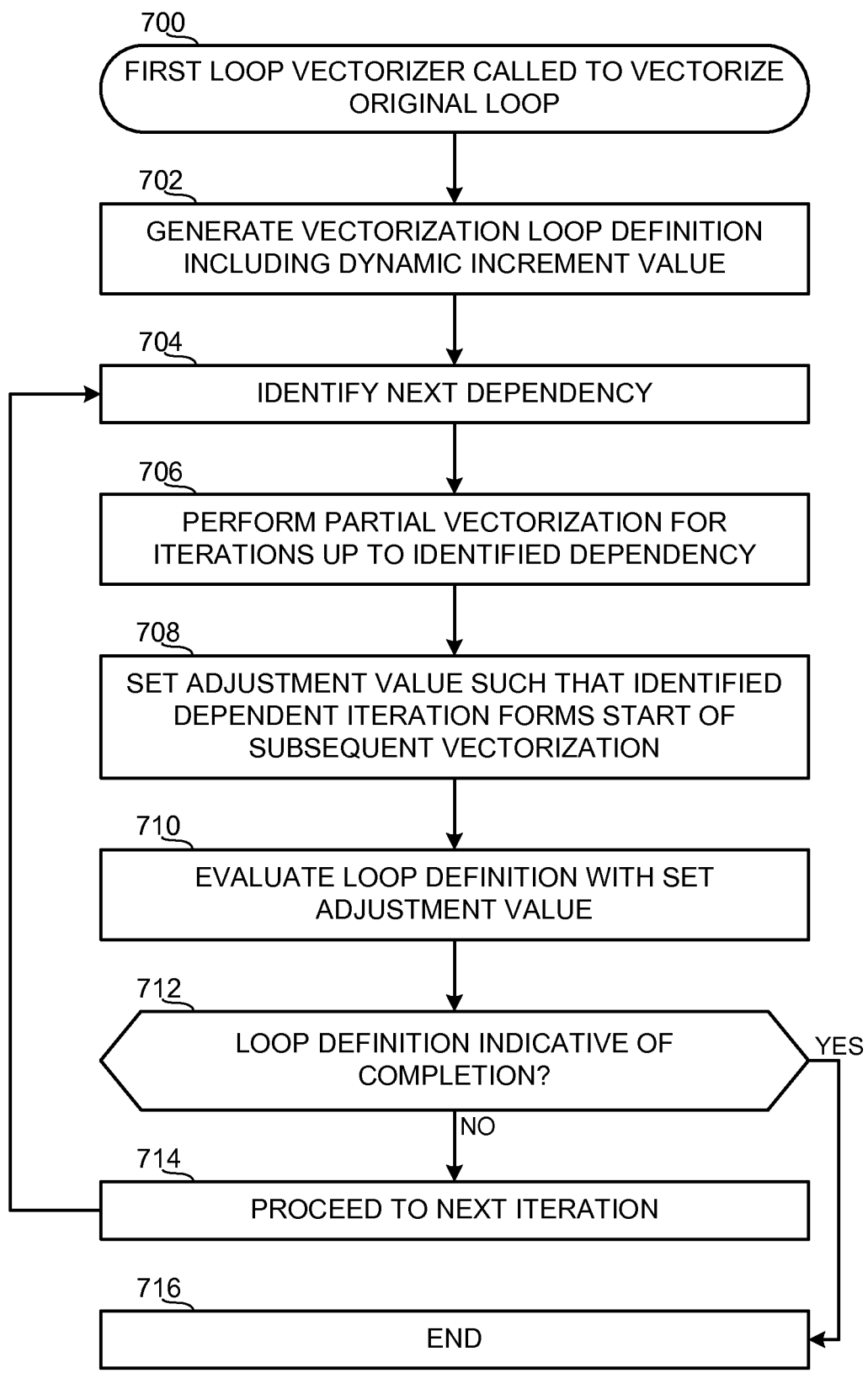
FIG. 7 is a flowchart representative of example machine readable instructions that may be executed to implement the first example loop vectorizer of FIG. 3.
Figure 8:
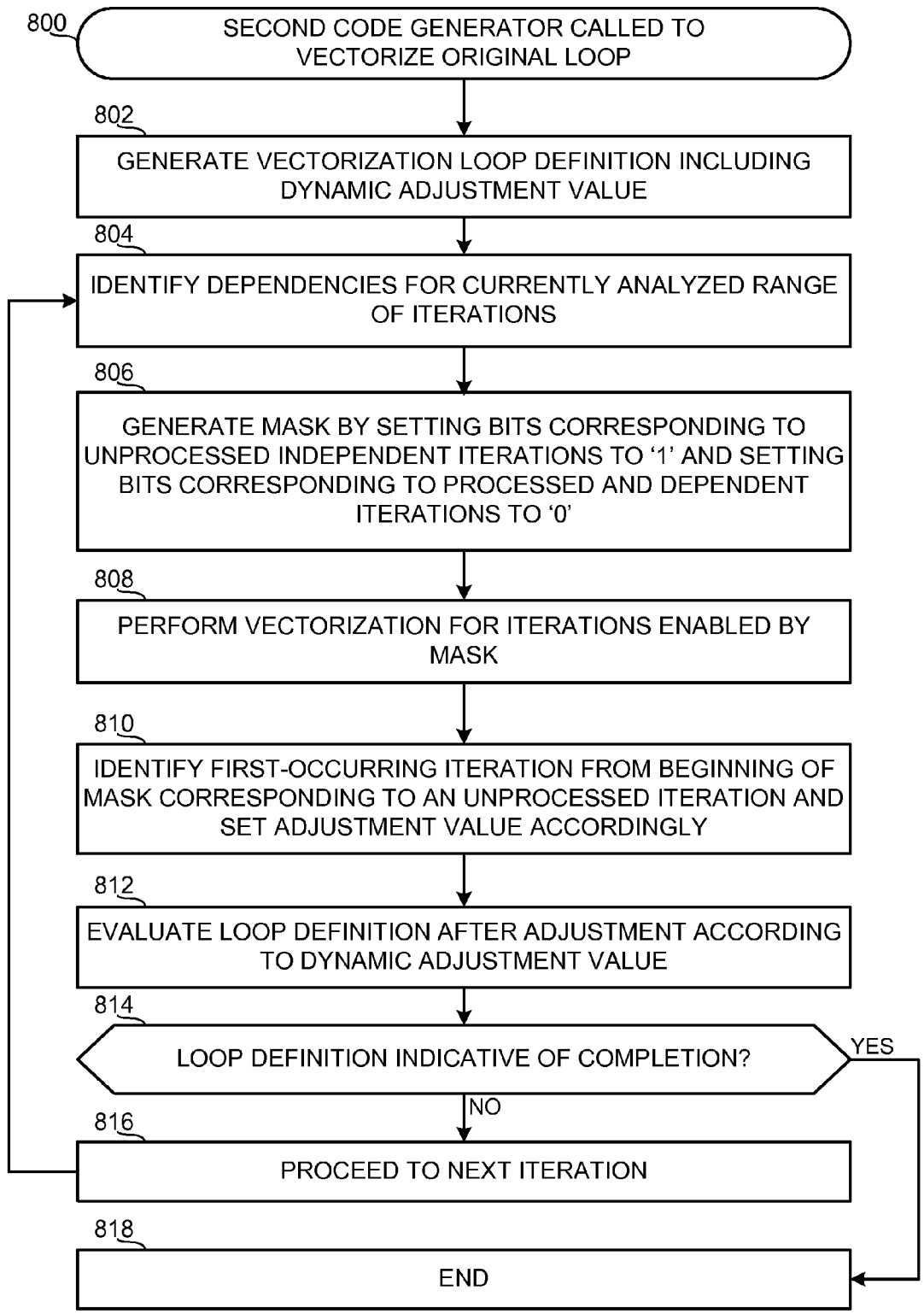
FIG. 8 is a flowchart representative of example machine readable instructions that may be executed to implement the second example loop vectorizer of FIG. 5.

FIG. 7 is a flowchart representative of example machine readable instructions for implementing the first example loop vectorizer 300 of FIG. 3. FIG. 8 is a flowchart representative of example machine readable instructions for implementing the second example loop vectorizer 500 of FIG. 5. In the example flowcharts of FIGS. 7 and 8, the machine readable instructions comprise program(s) for execution by a processor such as the processor 912 shown in the example processor platform 900 discussed below in connection with FIG. 9. The program(s) may be embodied in software stored on a tangible computer readable storage medium such as a storage device, a storage disk, CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program(s) are described with reference to the flowcharts illustrated in FIGS. 7 and 8, many other methods of implementing the example loop vectorizer 300 may alternatively be used. For example, the order of execution of the blocks may be changed, and/or some of the blocks described may be changed, eliminated, or combined.

As mentioned above, the example processes of FIGS. 7 and 8 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals. Additionally or alternatively, the example processes of FIGS. 7 and 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 begins with the first example loop vectorizer 300 of FIG. 3 being called or tasked with vectorizing the loop 100 of the original code of FIG. 1A such that eligible (e.g., independent) iterations of the loop 100 are executed in parallel (block 700). The example loop definer 302 of FIG. 3 sets parameters of the loop 402 of FIG. 4A such that the loop 402 iterates according to a dynamically set value 'k' (block 702). The example loop definer 302 also sets a value for 'N' corresponding to a number of iterations for the loop 100 of the original code (block 702). The example dependency identifier 304 identifies which iteration of the loop 100 presents the first (with the first iteration of the loop 100 as a starting point) dependent iteration (block 704).

As described above in connection with FIGS. 3, 4A and 4B, the identified dependent iteration is a dividing point for a partial vectorization of the original loop 100. In the illustrated example, the grouper 306 of FIG. 3 uses the identified dependent iteration to determine which iteration(s) of the loop 100 are to form a vector. In particular, the example grouper 306 of FIG. 3 combines the iterations leading up to the identified first dependent iteration, thereby forming a vector that enables the grouped iterations to be executed in parallel (block 706).

The example dynamic adjustment setter 308 of FIG. 3 sets the dynamic adjustment value 'k' according to which iteration was identified by the dependency identifier 304 in the current iteration of the loop 402 (block 708). As described above, the setting of the dynamic value 'k' causes the subsequent vectorization to begin at the identified dependent iteration, which can potentially vectorize as many elements (e.g., loop iterations) as the vector length, rather than the remaining portions of a fixed value (as described in connection with the known technique of FIG. 2A). When the loop 402 of the example pseudo-code 400 has been adjusted (e.g., increased) according to the dynamically set value 'k,' the example loop evaluator 310 of FIG. 3 determines whether another iteration of the loop 402 is to be executed (block 710). If the increased value of 'i' is less than or equal to 'N,' the loop 402 proceeds to the next iteration and control passes to block 704 (block 714). Otherwise, the example of FIG. 7 ends (block 716).

FIG. 8 begins with the second example loop vectorizer 500 of FIG. 5 being called or tasked with vectorizing the loop 100 of the original code of FIG. 1A such that eligible (e.g., independent) iterations of the loop 100 are executed in parallel (block 800). The example loop definer 502 of FIG. 5 sets parameters of the loop 602 of FIG. 6A such that the loop 602 iterates according to a dynamically set value 'k' (block 802). The example loop definer 502 also sets a value for 'N' corresponding to a number of iterations for the loop 100 of the original code (block 802). The example dependency identifier 504 identifies data dependencies in a set of iterations of the loop 100 defined by a current value of 'i' and a minimum of 'N' and the value of '(i+VL−1)' (block 804).

The example mask generator 506 of FIG. 5 generates a mask based on the dependenc(ies) identified by the dependency identifier 504 for the identified set of loop iterations (block 806). The individual bits of the mask generated by the example mask generator 506 correspond to respective iterations of the currently analyzed set of iterations (e.g., iterations one (1) through sixteen (16) in the first iteration of the loop 502). In the illustrated example of FIG. 8, the mask generator 506 assigns ones (1s) to independent iterations (e.g., iterations that are not dependent on any other iteration of the currently analyzed set of iterations) and iterations that have already been vectorized (e.g., assigned to a vector register). The example mask generator 506 assigns zeroes (0s) to dependent iterations (e.g., iterations that are dependent on at least one iteration of the currently analyzed set of iterations) and iterations that have already been vectorized.

Using the mask generated at block 808, the example grouper 508 vectorizes iterations of the currently analyzed set of iterations that are enabled by the mask (e.g., assigned a logical one (1)) (block 808). In particular, the example grouper 508 groups those iterations into a vector (e.g., by placing data associated with the vectors in the same vector register). The example dynamic adjustment setter 510 sets the dynamic value of 'k' of the pseudo-code 600 of FIG. 6A according to how many consecutive iterations from the beginning of the currently analyzed set of iterations were vectorized by the grouper 508 (block 810).

The dynamic value 'k' is used to adjust (e.g., increase) the loop according to the loop definition. The dynamically adjusted value of 'i' in the loop definition enables the second example loop vectorizer 500 of FIG. 5 to analyze the next set of VL elements (e.g., sixteen (16) in the illustrated example) for possible vectorization. Before proceeding to further vectorization, the example loop evaluator 512 of FIG. 5 determines whether the loop 602 has completed (block 812). If the loop definition, after being adjusted (e.g., increased), indicates that the loop 602 has not completed (block 814), the loop 602 proceeds to the next iteration (block 816) and control passes to block 804. If the loop definition, after being adjusted, indicates that the loop 602 has completed (block 814), the example of FIG. 8 ends (block 818).

Figure 9:
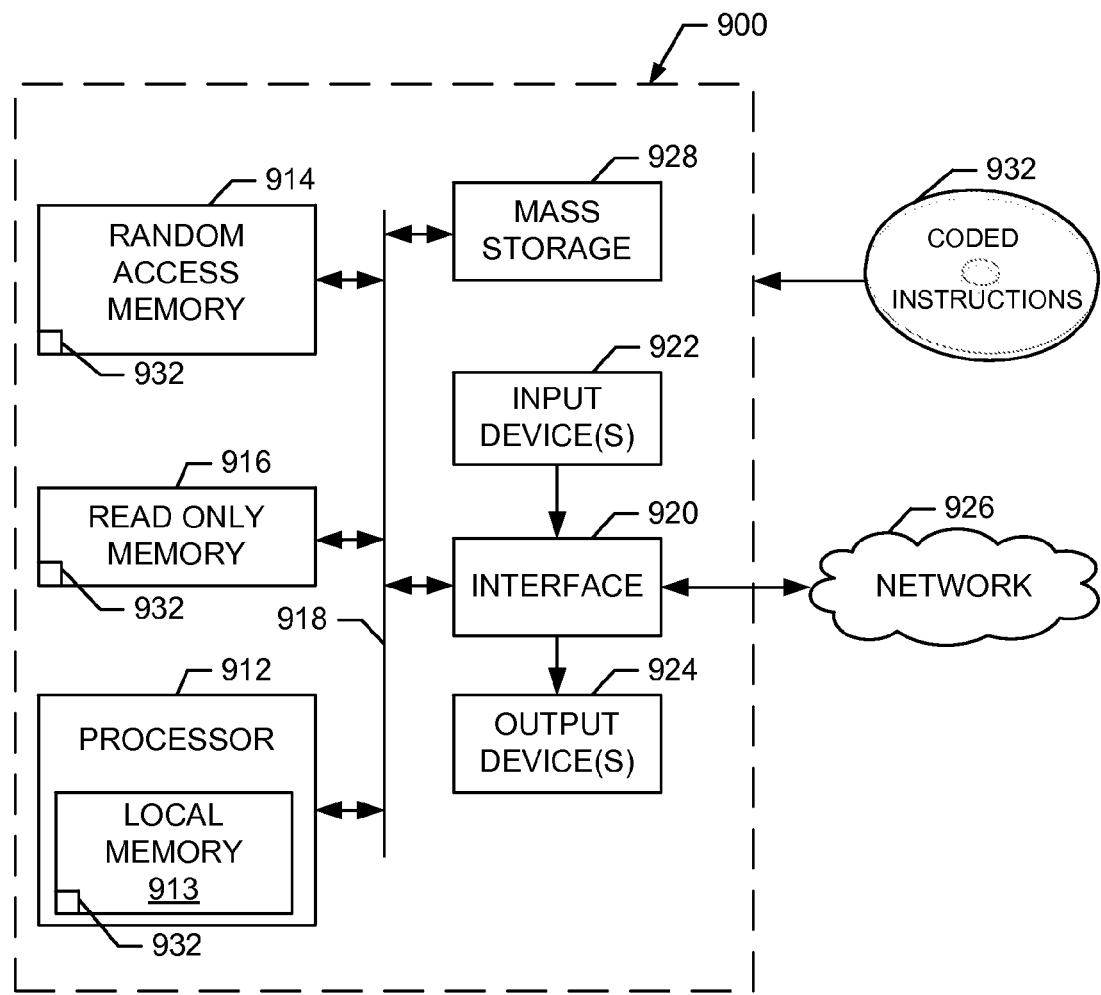
FIG. 9 is a block diagram of an example processing system capable of executing the example machine readable instructions of FIG. 7 to implement the first example loop vectorizer of FIG. 3 and/or the example machine readable instructions of FIG. 8 to implement the second example loop vectorizer of FIG. 5.

FIG. 9 is a block diagram of an example processor platform 900 capable of executing the instructions of FIG. 7 to implement the first example loop vectorizer 300 of FIG. 3 and/or the instructions of FIG. 8 to implement the second example loop vectorizer 500 of FIG. 5. The processor platform 900 can be, for example, a server, a personal computer, an Internet appliance, a DVD player, a smart phone, a tablet, and/or any other type of computing device.

The processor platform 900 of the instant example includes a processor 912. For example, the processor 912 can be implemented by one or more hardware processors, logic circuitry, cores, microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a trackpad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and data. Examples of such mass storage devices 928 include floppy disk drives, hard drive disks, compact disk drives and digital versatile disk (DVD) drives.

Coded instructions 932 (e.g., the machine readable instructions of FIGS. 7 and/or 8) may be stored in the mass storage device 928, in the volatile memory 914, in the non-volatile memory 916, and/or on a removable storage medium such as a CD or DVD.

Example methods include setting a dynamic adjustment value of a vectorization loop; executing the vectorization loop to vectorize a loop by grouping iterations of the loop into one or more vectors; identifying a dependency between iterations of the loop; and setting the dynamic adjustment value based on the identified dependency.

In some example methods, the dynamic adjustment value increases or decreases a parameter of a definition of the vectorization loop.

Some example methods further include grouping a first iteration of the loop and a second iteration of the loop occurring before the first iteration to form a first one of the one or more vectors.

Some example methods further include adjusting a parameter of a definition of the vectorization loop according to the dynamic adjustment value such that a subsequent iteration of the vectorization loop begins after the identified dependency.

Some example methods further include generating a first mask for a first iteration of the vectorization loop to enable, for the first iteration of the vectorization loop, vectorization of independent iterations of loop and to disable vectorization of dependent iterations of the loop.

In some example methods, setting the dynamic adjustment value based on the identified dependency comprises determining a first occurring unprocessed iteration from a start of the first mask.

Some example methods further include grouping iterations of the loop that are enabled by the first mask.

Some example methods further include generating a second mask for a second iteration of the vectorization loop subsequent to the first iteration of the vectorization loop, wherein the first mask and the second mask have a length corresponding to a vector length associated with the vectorization loop.

Example tangible machine readable storage media have instructions that, when executed, cause a machine to at least set a dynamic adjustment value of a vectorization loop; execute the vectorization loop to vectorize a loop by grouping iterations of the loop into one or more vectors; identify a dependency between iterations of the loop; and set the dynamic adjustment value based on the identified dependency.

In some example storage media, the dynamic adjustment value is to increase or decrease a parameter of a definition of the vectorization loop.

In some example storage media, the instructions cause the machine to group a first iteration of the loop and a second iteration of the loop occurring after the first iteration to form a first one of the one or more vectors.

In some example storage media, the instructions cause the machine to adjust a parameter of a definition of the vectorization loop according to the dynamic adjustment value such that a subsequent iteration of the vectorization loop begins after the identified dependency.

In some example storage media, the instructions cause the machine to generate a first mask for a first iteration of the vectorization loop to enable, for the first iteration of the vectorization loop, vectorization of independent iterations of the loop and to disable vectorization of dependent iterations of the loop.

In some example storage media, setting the dynamic adjustment value based on the identified dependency comprises determining a first occurring unprocessed iteration from a start of the first mask.

In some example storage media, the instructions cause the machine to group iterations of the loop enabled by the first mask.

In some example storage media, the instructions cause the machine to generate a second mask for a second iteration of the vectorization loop subsequent to the first iteration of the vectorization loop, wherein the first mask and the second mask have a length corresponding to a vector length associated with the vectorization loop.

Example apparatus to convert code include a loop definer to define a vectorization loop to include a dynamic adjustment value, the vectorization loop to vectorize a loop by grouping elements of the loop into one or more vectors; an identifier to identify a dependency between iterations of the loop; and a dynamic setter to set the dynamic adjustment value of the vectorization loop based on the identified dependency.

Some example apparatus further include a grouper group a first iteration of the loop and a second iteration of the original code occurring after the first iteration to form a first one of the one or more vectors.

Some example apparatus further include a mask generator to generate a first mask for a first iteration of the vectorization loop to enable, for the first iteration of the vectorization loop, vectorization of independent iterations of the loop and to disable vectorization of dependent iterations of the loop.

In some example apparatus, the setter is to set the dynamic adjustment value based on the identified dependency by determining a first occurring unprocessed iteration from a start of the first mask.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method, comprising:
    prior to executing an original loop having iterations:
        analyzing, via a processor, the iterations of the original loop;
        identifying, via the processor, a dependency between a first one of the iterations of the original loop and a second one of the iterations of the original loop;
        after identifying the dependency, vectorizing, via the processor, a first group of the iterations of the original loop based on the identified dependency to form a vectorization loop;
        generating a first mask for a first iteration of the vectorization loop to enable, for the first iteration of the vectorization loop, vectorization of independent ones of the iterations of the original loop and to disable vectorization of dependent ones of the iterations of the original loop; and
        setting, via the processor, a dynamic adjustment value of the vectorization loop based on the identified dependency at least by identifying a first occurring unprocessed iteration of the original loop from a start of the first mask.

2. A method as defined in claim 1, wherein the setting of the dynamic adjustment value further includes increasing or decreasing a parameter of a definition of the vectorization loop.

3. A method as defined in claim 1, wherein the first group includes the first one of the iterations of the original loop, and further including vectorizing a second group of the iterations of the original loop, wherein the second group includes the second one of the iterations of the original loop.

4. A method as defined in claim 1, further including adjusting a parameter of a definition of the vectorization loop according to the dynamic adjustment value such that a subsequent iteration of the vectorization loop begins after the identified dependency.

5. A method as defined in claim 1, wherein the vectorizing of the first group of the iterations includes grouping iterations of the original loop that are enabled by the first mask.

6. A method as defined in claim 1, further including generating a second mask for a second iteration of the vectorization loop subsequent to the first iteration of the vectorization loop, wherein the first mask and the second mask have a length corresponding to a vector length associated with the vectorization loop.

7. A non-transitory tangible computer readable storage medium comprising instructions that, when executed, cause a machine to at least:
    prior to executing an original loop having iterations:
        analyze the iterations of the original loop;
        identify a dependency between a first one of the iterations of the original loop and a second one of the iterations of the original loop;
        after identifying the dependency, vectorize a first group of the iterations of the original loop based on the identified dependency to form a vectorization loop;
        generate a first mask for a first iteration of the vectorization loop to enable, for the first iteration of the vectorization loop, vectorization of independent ones of the iterations of the original loop and to disable vectorization of dependent ones of the iterations of the original loop; and
        set a dynamic adjustment value of the vectorization loop based on the identified dependency at least by determining a first occurring unprocessed iteration of the original loop from a start of the first mask.

8. A storage medium as defined in claim 7, wherein the instructions, when executed, cause the machine to adjust the dynamic adjustment value by increasing or decreasing a parameter of a definition of the vectorization loop.

9. A storage medium as defined in claim 7, wherein the first group includes the first one of the iterations of the original loop, and the instructions, when executed, cause the machine to vectorize a second group of the iterations of the original loop, wherein the second group includes the second one of the iterations of the original loop.

10. A storage medium as defined in claim 7, wherein the instructions, when executed, cause the machine to adjust a parameter of a definition of the vectorization loop according to the dynamic adjustment value such that a subsequent iteration of the vectorization loop begins after the identified dependency.

11. A storage medium as defined in claim 7, wherein the instructions, when executed, cause the machine to vectorize the first group of the iterations by grouping iterations of the original loop that are enabled by the first mask.

12. A storage medium as defined in claim 7, wherein the instructions, when executed, cause the machine to generate a second mask for a second iteration of the vectorization loop subsequent to the first iteration of the vectorization loop, wherein the first mask and the second mask have a length corresponding to a vector length associated with the vectorization loop.

13. An apparatus to convert code, comprising:
a loop vectorizer to vectorize iterations of an original loop, the loop vectorizer including:
a definer to, prior to executing the original loop, analyze the iterations of the original loop;
an identifier to, prior to the executing of the original loop, identify a dependency between a first one of the iterations of the original loop and a second one of the iterations of the original loop;
a grouper to, prior to the executing of the original loop and after identifying the dependency, vectorize a first group of the iterations of the original loop based on the identified dependency to form a vectorization loop;
a mask generator to generate a first mask for a first iteration of the vectorization loop to enable, for the first iteration of the vectorization loop, vectorization of independent iterations of the original loop and to disable vectorization of dependent iterations of the original loop; and
a dynamic adjustment setter to, prior to the executing of the first one of the iterations of the original loop, set a dynamic adjustment value of the vectorization loop based on the identified dependency at least by determining a first occurring unprocessed iteration of the original loop from a start of the first mask, at least one of the definer, the identifier, the grouper, or the dynamic adjustment setter implemented by a processor and stored in a memory of the apparatus.

14. An apparatus as defined in claim 13, wherein the grouper is to group the first one of the first iterations of the original loop into the first group, and to group the second one of the iterations of the original loop into a second group.

15. A method as defined in claim 1, wherein all of the iterations of the original loop are processed via the vectorization loop before the executing of the original loop.

* * * * *